(12) United States Patent
Yatagawa et al.

(10) Patent No.: US 11,315,731 B2
(45) Date of Patent: Apr. 26, 2022

(54) CERAMIC ELECTRONIC DEVICE AND MANUFACTURING METHOD OF THE SAME

(71) Applicant: TAIYO YUDEN CO., LTD., Tokyo (JP)

(72) Inventors: Kiyoshiro Yatagawa, Tokyo (JP); Satoshi Kobayashi, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 17/116,114

(22) Filed: Dec. 9, 2020

(65) Prior Publication Data
US 2021/0183574 A1 Jun. 17, 2021

(30) Foreign Application Priority Data
Dec. 13, 2019 (JP) .............................. JP2019-225628

(51) Int. Cl.
*H01G 4/224* (2006.01)
*H01G 4/008* (2006.01)
*H01G 4/30* (2006.01)
*H01G 4/012* (2006.01)
*H01G 4/12* (2006.01)

(52) U.S. Cl.
CPC ............. *H01G 4/224* (2013.01); *H01G 4/008* (2013.01); *H01G 4/012* (2013.01); *H01G 4/30* (2013.01); *H01G 4/12* (2013.01)

(58) Field of Classification Search
CPC .......... H01G 4/008; H01G 4/012; H01G 4/12; H01G 4/224; H01G 4/232; H01G 4/30
See application file for complete search history.

(56) References Cited

U.S. PATENT DOCUMENTS

| | | | | |
|---|---|---|---|---|
| 8,584,348 | B2 * | 11/2013 | Wei ........................... | H01G 2/10 29/602.1 |
| 9,758,695 | B2 * | 9/2017 | Hong ........................ | H01G 4/30 |
| 9,997,293 | B2 * | 6/2018 | Inoue ....................... | H01C 7/102 |
| 10,403,438 | B2 * | 9/2019 | Sato ......................... | H01G 4/224 |
| 10,770,232 | B2 * | 9/2020 | Han ........................ | H01G 4/2325 |
| 10,910,161 | B2 * | 2/2021 | Yang ....................... | H01G 4/224 |
| 2011/0287176 | A1 | 11/2011 | Saito et al. | |
| 2019/0304684 | A1 * | 10/2019 | Yoshida ................... | C25D 5/12 |

(Continued)

FOREIGN PATENT DOCUMENTS

| JP | 2001-102247 A | 4/2001 |
|---|---|---|
| JP | 2012-4544 A | 1/2012 |

*Primary Examiner* — Nathan Milakovich
(74) *Attorney, Agent, or Firm* — Chen Yoshimura LLP

(57) ABSTRACT

A ceramic electronic device includes a multilayer chip in which each of a plurality of dielectric layers and each of a plurality of internal electrode layers are alternately stacked, the plurality of internal electrode layers being exposed to at least one of a first end face and a second end face of the multilayer chip, the first end face being opposite to the second end face, external electrodes respectively provided on the first end face and the second end face, and a water repellent agent that is provided on at least one face of four faces of a rectangular parallelepiped shape of the multilayer chip other than the first and second end faces, is spaced from the first and second external electrodes, and extends in a direction intersecting with a direction in which the external electrodes face with each other.

18 Claims, 9 Drawing Sheets

(56) References Cited

U.S. PATENT DOCUMENTS

| | | | |
|---|---|---|---|
| 2020/0135404 A1* | 4/2020 | Chun | B05D 5/12 |
| 2020/0234885 A1* | 7/2020 | Yatagawa | H01G 4/1209 |
| 2020/0312571 A1* | 10/2020 | Yatagawa | H01G 4/224 |
| 2021/0151256 A1* | 5/2021 | Yatagawa | H01G 4/012 |

* cited by examiner

CERAMIC ELECTRONIC DEVICE AND MANUFACTURING METHOD OF THE SAME

FIELD

A certain aspect of the present invention relates to a ceramic electronic device and a manufacturing method of the ceramic electronic device.

BACKGROUND

Since electronic devices are downsized and thicknesses of the electronic devices are reduced, downsizing and thickness reduction of ceramic electronic devices are required. The ceramic electronic devices are used for various electronic devices. Therefore, usage under various conditions of the ceramic electronic devices is required. As an example, the ceramic electronic devices are used under a high temperature and a high humidity. However, when the ceramic electronic devices are used under the high temperature and the high humidity, the ceramic electronic devices may be electrically broken down because of dew condensation. And so, there is disclosed a technology in which a water repellent agent is provided on the surface of the ceramic electronic devices by surface treatment (for example, see Japanese Patent Application Publication No. 2012-4544).

SUMMARY OF THE INVENTION

However, in the technology, it is necessary to remove the water repellent agent of the surface, before mounting of the ceramic electronic devices, in order to prevent mounting failure.

According to an aspect of the present invention, there is provided a ceramic electronic device including: a multilayer chip in which each of a plurality of dielectric layers and each of a plurality of internal electrode layers are alternately stacked, a main component of the dielectric layers being ceramic, the multilayer chip having a rectangular parallelepiped shape, the plurality of internal electrode layers being exposed to at least one of a first end face and a second end face of the multilayer chip, the first end face being opposite to the second end face; external electrodes respectively provided on the first end face and the second end face; and a water repellent agent that is provided on at least one face of four faces of the rectangular parallelepiped shape of the multilayer chip other than the first and second end faces, is spaced from the first and second external electrodes, and extends in a direction intersecting with a direction in which the external electrodes face with each other.

According to another aspect of the present invention, there is provided a manufacturing method of a ceramic electronic device including: preparing a ceramic electronic device having a multilayer chip, and external electrodes, the multilayer chip having a structure in which each of a plurality of dielectric layers and each of a plurality of internal electrode layers are alternately stacked, a main component of the dielectric layers being ceramic, the multilayer chip having a rectangular parallelepiped shape, the plurality of internal electrode layers being exposed to at least one of a first end face and a second end face of the multilayer chip, the first end face being opposite to the second end face, the external electrodes being respectively provided on the first end face and the second end face; and forming an water repellent agent on at least one face of four faces of the rectangular parallelepiped shape of the multilayer chip other than the first and second end faces, wherein the water repellent agent is spaced from the first and second external electrodes, and extends in a direction intersecting with a direction in which the external electrodes face with each other.

According to another aspect of the present invention, there is provided a ceramic electronic device including: a multilayer chip in which each of a plurality of dielectric layers and each of a plurality of internal electrode layers are alternately stacked, a main component of the dielectric layers being ceramic, the multilayer chip having a rectangular parallelepiped shape, the plurality of internal electrode layers being exposed to at least one of a first end face and a second end face of the multilayer chip, the first end face being opposite to the second end face; external electrodes respectively provided on the first end face and the second end face; and a material layer that is provided on at least one face of four faces of the rectangular parallelepiped shape of the multilayer chip other than the first and second end faces, is spaced from the first and second external electrodes, extends in a direction intersecting with a direction in which the external electrodes face with each other, and a contact angle of the material layer with respect to water is 90 degrees or more.

DETAILED DESCRIPTION

A description will be given of an embodiment with reference to the accompanying drawings.

Figure 1:
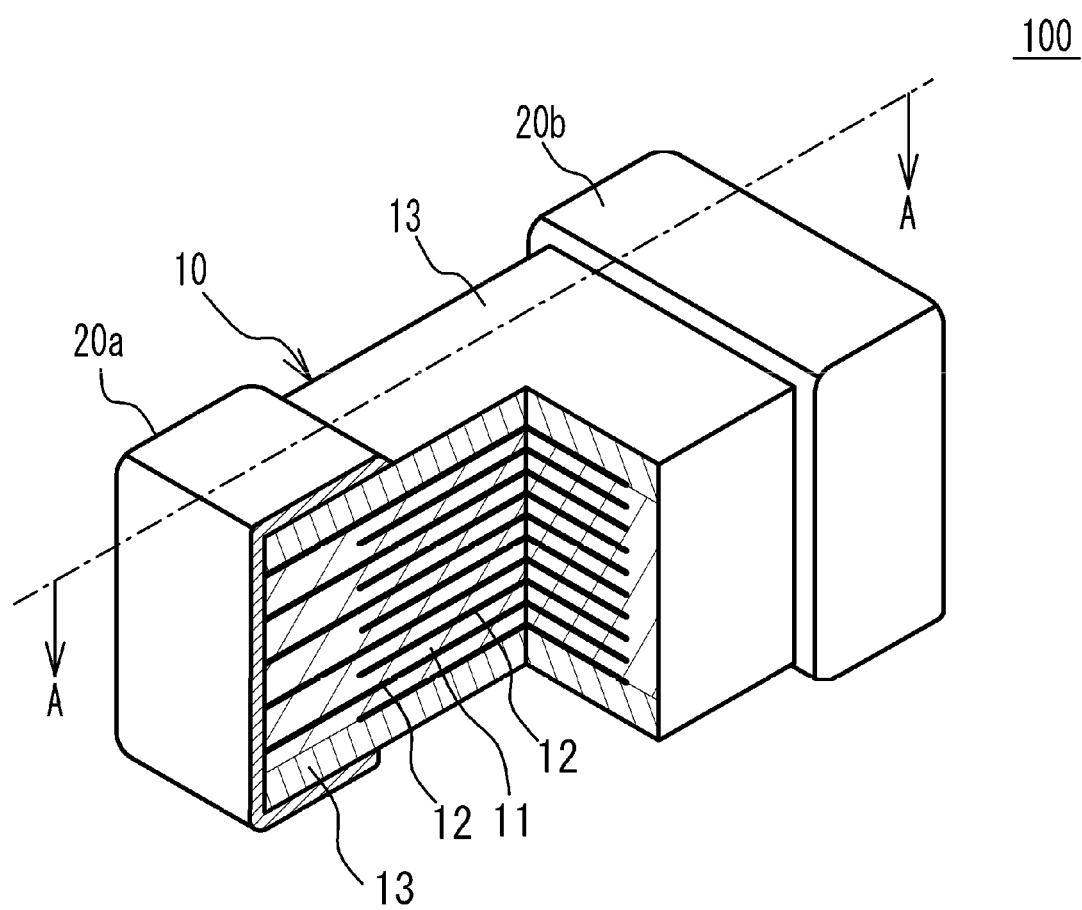
FIG. 1 illustrates a perspective view of a multilayer ceramic capacitor in which a cross section of a part of the multilayer ceramic capacitor is illustrated.

(Embodiment) A description will be given of an outline of a multilayer ceramic capacitor. FIG. 1 illustrates a perspective view of a multilayer ceramic capacitor 100 in accordance with an embodiment, in which a cross section of a part of the multilayer ceramic capacitor 100 is illustrated. As illustrated in FIG. 1, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face is opposite to the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In a multilayer structure of the dielectric layers 11 and the internal electrode layers 12, the internal electrode layer 12 is positioned at an outermost layer in a stacking direction. The upper face and the lower face of the multilayer structure that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure.

Figure 2:
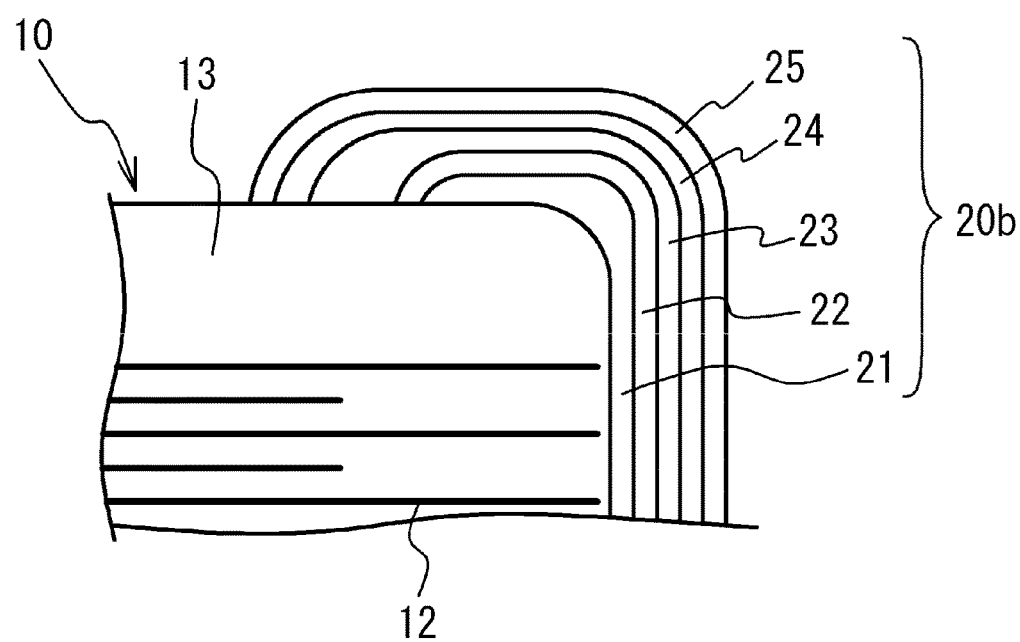
FIG. 2 illustrates a cross sectional view of an external electrode and is a partial cross sectional view taken along a line A-A of FIG. 1.

FIG. 2 illustrates a cross sectional view of the external electrode 20b and is a partial cross sectional view taken along a line A-A of FIG. 1. In FIG. 2, hatching for cross section is omitted. As illustrated in FIG. 2, the external electrode 20b has a structure in which a first plated layer 22 such as Cu, a conductive resin layer 23, a second plated layer 24 such as Ni and a third plated layer 25 such as Sn are formed on a base layer 21 in this order. The base layer 21, the first plated layer 22, the conductive resin layer 23, the second plated layer 24 and the third plated layer 25 extend toward the upper face, the lower face, and the two side faces of the multilayer chip 10 from the both end faces of the multilayer chip 10.

A main component of the base layer 21 is a metal such as Cu, Ni, Al (aluminum) or Zn (zinc). The base layer 21 includes a glass component for densifying the base layer 21 or a co-material for controlling sinterability of the base layer 21. The base layer 21 including these ceramic components has high adhesiveness with the cover layer 13 whose main component is a ceramic material. The conductive resin layer 23 is a resin layer including a metal component such as Ag. The conductive resin layer 23 is flexible. Therefore, the conductive resin layer 23 suppresses stress caused by deflection of a substrate on which the multilayer ceramic capacitor 100 is mounted. The first plated layer 22 is provided in order to increase adhesiveness between the base layer 21 and the conductive resin layer 23. The external electrode 20a has the same structure as the external electrode 20b. The conductive resin layer 23 may not be necessarily provided.

When the external electrodes 20a and 20b have the structure illustrated in FIG. 2 and the multilayer ceramic capacitor 100 is used in high-temperature and high-humidity condition, a metal component of the conductive resin layer 23 may diffuse because of water adhered to the surface of the multilayer ceramic capacitor 100. In this case, reliability of the multilayer ceramic capacitor 100 may be degraded. For example, the metal component of the conductive resin layer 23 may diffuse to the surface of the multilayer chip 10 between the external electrode 20a and the external electrode 20b (migration phenomena). Even if the external electrodes 20a and 20b do not include the conductive resin layer 23, another metal component of the external electrodes 20a and 20b may diffuse.

Figure 3A:
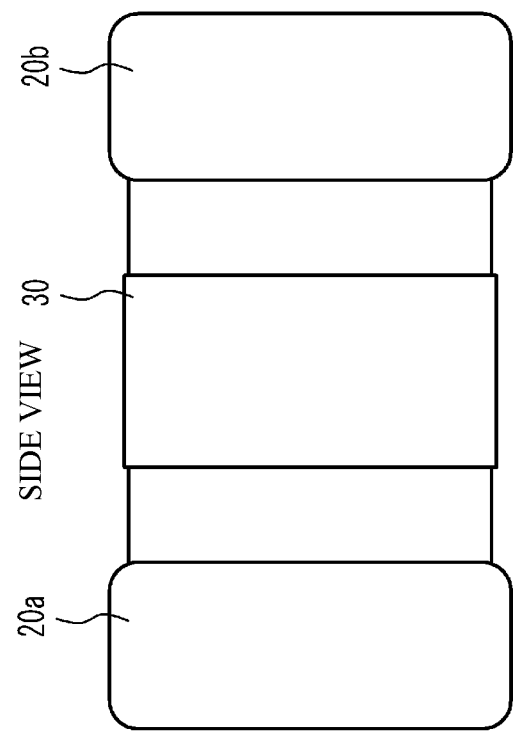
FIG. 3A illustrates a top view of a multilayer ceramic capacitor.
Figure 3B:
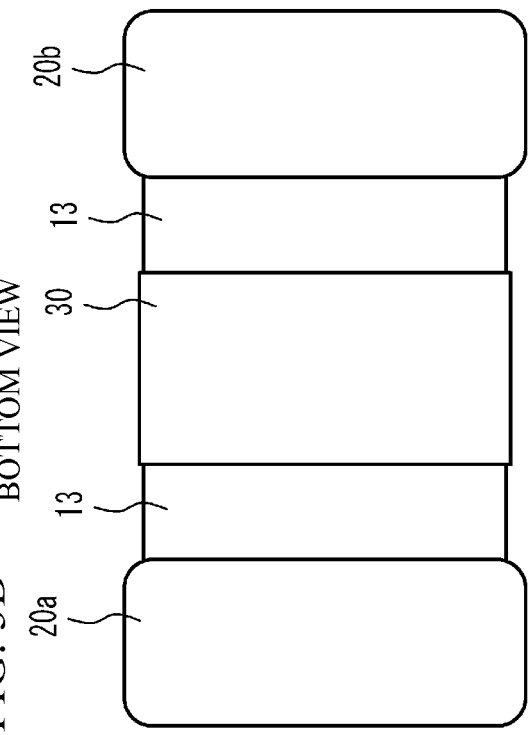
FIG. 3B and FIG. 3C illustrate side views of a multilayer ceramic capacitor.
Figure 3C:
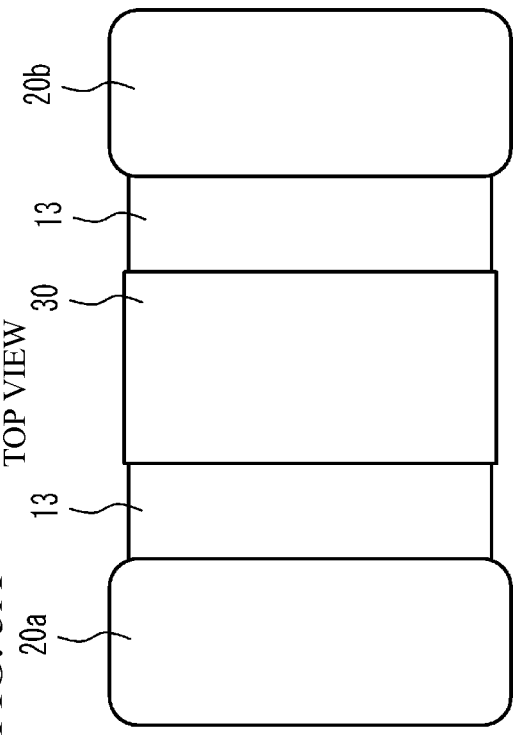
Figure 3D:
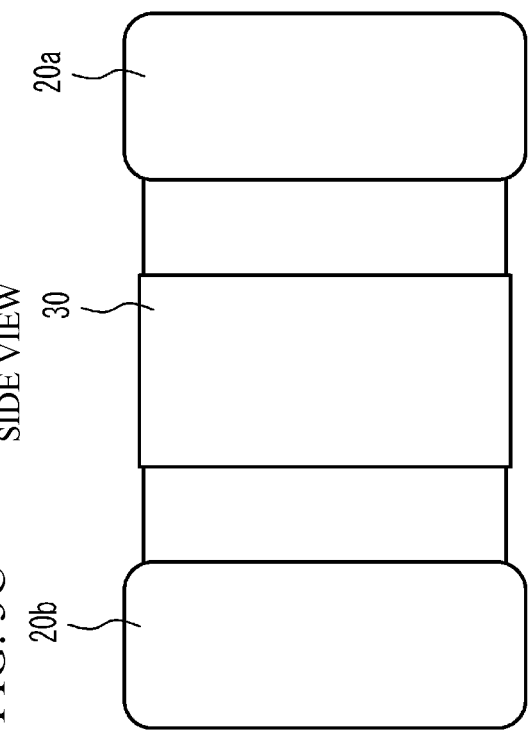
FIG. 3D illustrates a bottom view of a multilayer ceramic capacitor.

And so, the multilayer ceramic capacitor 100 of the embodiment has a water repellent agent 30, as illustrated in FIG. 3A to FIG. 3D. FIG. 3A illustrates a top view of the multilayer ceramic capacitor 100. FIG. 3B and FIG. 3C illustrate side views of the multilayer ceramic capacitor 100. FIG. 3D illustrates a bottom view of the multilayer ceramic capacitor 100.

As illustrated in FIG. 3A to FIG. 3D, the multilayer ceramic capacitor 100 has the water repellent agent 30 on at least one of the upper face, the lower face and the side faces of the multilayer chip 10, between the external electrode 20a and the external electrode 20b. The water repellent agent 30 is spaced from the external electrodes 20a and 20b. The water repellent agent 30 extends in a direction intersecting with the direction in which the external electrode 20a faces the external electrode 20b. Since the water repellent agent 30 is spaced from the external electrodes 20a and 20b, the water repellent agent 30 is partially provided on at least one of the upper face, the lower face and the side faces of the multilayer chip 10.

As illustrated in FIG. 3A and FIG. 3D, on the upper face and the lower face of the multilayer chip 10, the water repellent agent 30 is provided from one of the side faces to the other of the side faces and has a belt shape. As illustrated in FIG. 3B and FIG. 3C, the water repellent agent 30 is provided on each of the side faces of the multilayer chip 10 from the upper face to the lower face and has a belt shape. In FIG. 3A to FIG. 3D, the water repellent agent 30 extends in a direction vertical to the direction in which the externa electrode 20a faces the external electrode 20b. The water repellent agent 30 continuously extends from each face to a face next to the face, on each corner of the multilayer chip 10.

In the embodiment, the water repellent agent 30 has water repellency function with respect to water. Moreover, the upper face, the lower face and the side faces of the multilayer chip 10 have a first region which is covered by the water repellent agent 30 and a second region which is not covered by the water repellent agent 30, since the water repellent agent 30 is spaced from the external electrodes 20a and 20b. In this case, wettability of the first region with respect to water is different from that of the second region with respect to water. Water is guided by the second region and spreads. Therefore, the water is broken on the surface of the water repellent agent 30. Thus, connection between the external electrode 20a and the external electrode 20b through the water is prevented. It is therefore possible to suppress occurrence of breakdown of the multilayer ceramic capacitor 100 caused by the migration caused by dew condensation.

The water repellent agent 30 is not provided on the surface of the external electrodes 20a and 20b, because the water repellent agent 30 is spaced from the external electrodes 20a and 20b. It is therefore possible to prevent mounting failure of the multilayer ceramic capacitor 100. Therefore, it is not necessary to remove the water repellent agent 30 before the mounting.

Accordingly, it is possible to suppress the mounting failure even if the water repellent agent is not removed.

It is possible to provide a sufficient amount of the water repellent agent 30 on a requested region, because the water repellent agent 30 does not influence on the mounting failure.

The embodiment achieves remarkable effect in the multilayer ceramic capacitor which has the external electrode having the conductive resin layer 23 including grains such as silver causing the migration.

The material of the water repellent agent 30 is not limited when a contact angle of the material with respect to water is 90 degrees or more. The water repellent agent 30 is, for example, a silicon-based material. As the silicon-based material, organic compound having a siloxane bonding can be used. For example, the organic compound having the siloxane bonding is a small molecule cyclic siloxane which is a cyclic siloxane from D3 to D20. For example, the small molecule cyclic siloxane D3 is trimer of the cyclic siloxane which is a solid substance of hexamethyl cyclotrisiloxane ($C_6H_{18}O_3Si_3$). The small molecule cyclic siloxane D4 is tetramer of the cyclic siloxane which is semi-solid substance of octamethyl cyclotetrasiloxane ($C_8H_{24}O_4Si_4$). The organic compound having the siloxane bonding releases the small molecule cyclic siloxane Dn (n≥3) at a relatively high temperature. Therefore, the organic compound having the siloxane bonding tends to be left after mounting the multilayer ceramic capacitor 100 with solder.

Alternatively, as the material of the water repellent agent 30, fluorine-based material can be used.

For example, when the water repellent agent 30 does not have a sufficiently large width in the direction in which the external electrode 20a faces the external electrode 20b, it may not necessarily possible to prevent the connection between the external electrode 20a and the external electrode 20b through the water. And so, it is preferable that the width of the water repellent agent 30 in the direction in which the external electrode 20a faces the external electrode 20b has a lower limit. For example, it is preferable that the width of the water repellent agent 30 in the direction in which the external electrode 20a faces the external electrode 20b is 0.3 mm or more. It is more preferable that the width is 0.7 mm or more. It is still more preferable that the width is 1.0 mm or more.

On at least one of the upper face, the lower face and the side faces of the multilayer chip 10, the water repellent agent 30 may be spaced from the external electrodes 20a and 20b and may be provided so as to extend in the direction intersecting with the direction in which the external electrode 20a faces the external electrode 20b, without breaking.

For example, the water repellent agent 30 has a thickness of 5 nm to 100 nm.

Figure 4:
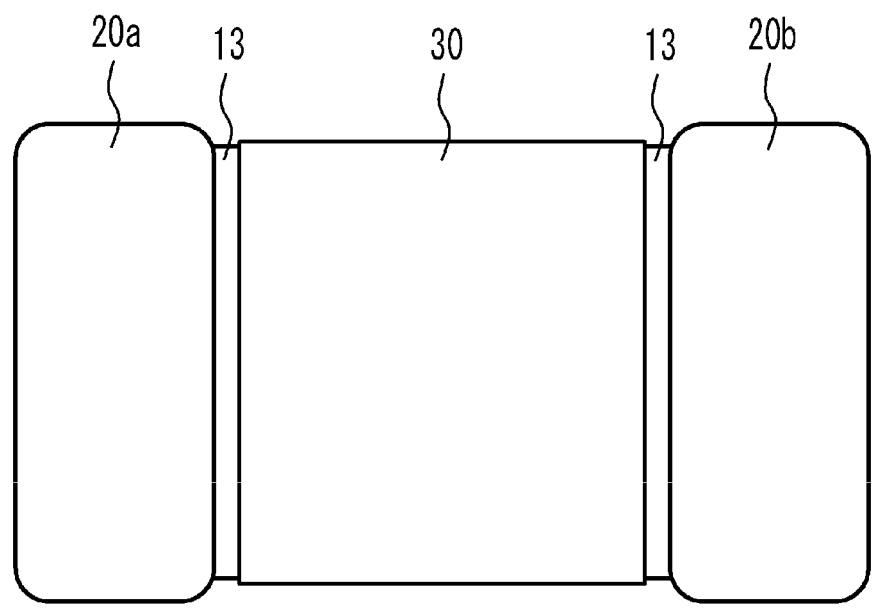
FIG. 4 illustrates a top view of a multilayer ceramic capacitor.
Figure 5:
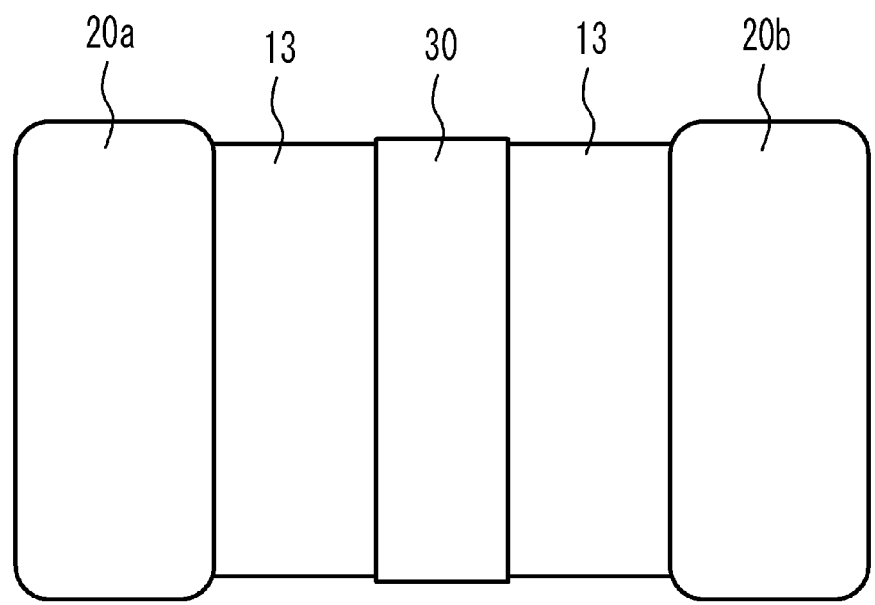
FIG. 5 illustrates a top view of a multilayer ceramic capacitor.

As illustrated in FIG. 4, in the direction in which the external electrode 20a faces the external electrode 20b, the width of the water repellent agent 30 may be larger than a width of each exposed region of the multilayer chip 10. Alternatively, as illustrated in FIG. 5, in the direction in which the external electrode 20a faces the external electrode 20b, the width of the water repellent agent 30 may be smaller than the width of each exposed region of the multilayer chip 10.

Figure 6:
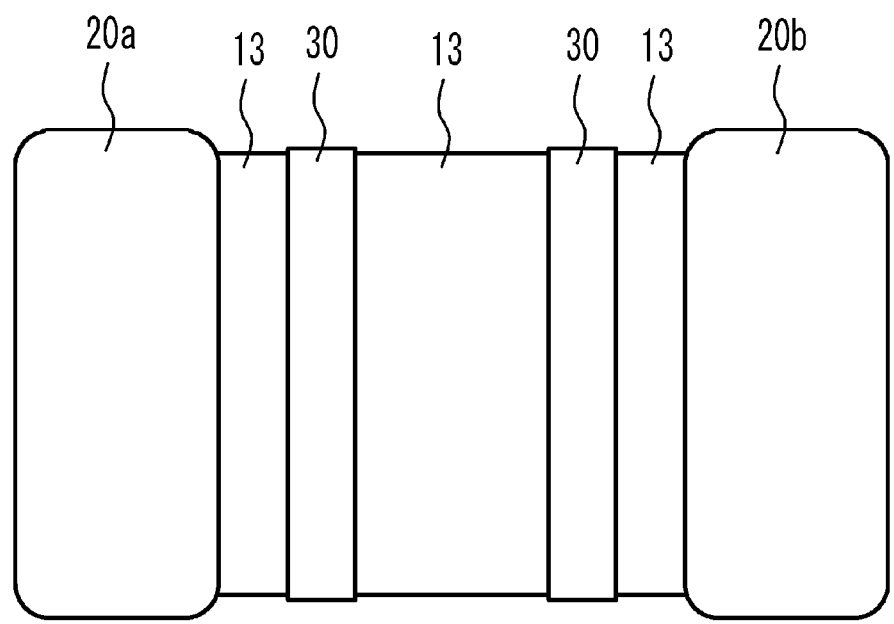
FIG. 6 illustrates a top view of a multilayer ceramic capacitor.

Alternatively, as illustrated in FIG. 6, the water repellent agent 30 may have two belts between the external electrode 20a and the external electrode 20b. The two belts may be spaced from the external electrode 20a and the external electrode 20b and extend in the direction intersecting with the direction in which the external electrode 20a faces the external electrode 20b. The two belts may be spaced from each other.

Figure 7:
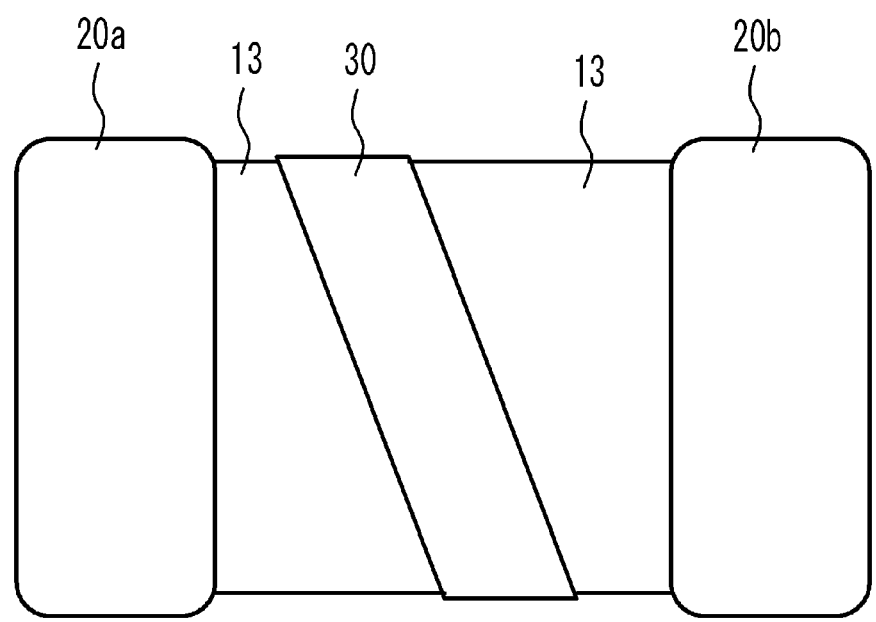
FIG. 7 illustrates a top view of a multilayer ceramic capacitor.

Alternatively, the water repellent agent 30 may not necessarily extend in a direction vertical to the direction in which the external electrode 20a faces the external electrode 20b. For example, as illustrated in FIG. 7, the water repellent agent 30 may extend in the direction intersecting with the direction in which the external electrode 20a faces the external electrode 20b (for example, the intersecting angle is approximately 45 degrees).

Each of FIG. 4 to FIG. 7 illustrates a top view.

Alternatively, the water repellent agent 30 may be broken on the corner of the multilayer chip 10, from each face to another face next to the face. For example, the location of the water repellent agent 30 of the upper face may be different from the location of the water repellent agent 30 of the side faces. The water repellent agent 30 of the upper face may not necessarily be connected to the water repellent agent 30 of the side faces, although the water repellent agent 30 extends from the upper face of the multilayer chip 10 to the side faces, and the water repellent agent 30 may be formed on the side faces from the upper face to the lower face.

Figure 8:
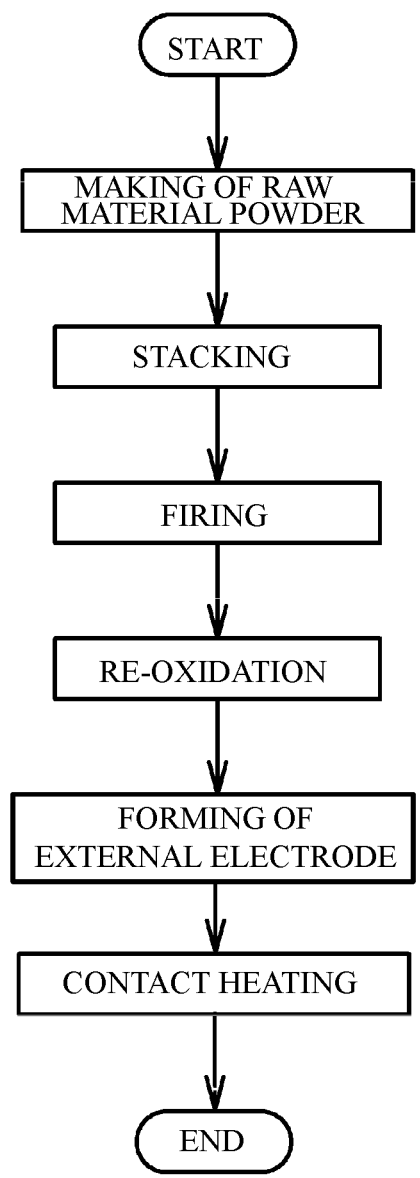
FIG. 8 illustrates a manufacturing method of a multilayer ceramic capacitor.
Figure 9:
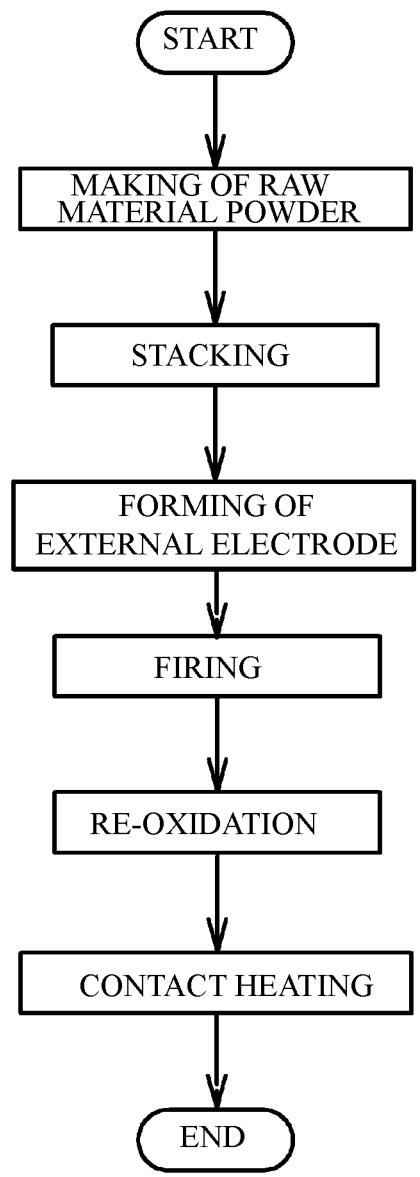
FIG. 9 illustrates a manufacturing method of a multilayer ceramic capacitor.

Next, a description will be given of a manufacturing method of the multilayer ceramic capacitor 100. FIG. 8 illustrates a manufacturing method of the multilayer ceramic capacitor 100.

(Making process of raw material powder) A dielectric material for forming the dielectric layer 11 is prepared. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiment may use any of these methods.

An additive compound may be added to resulting ceramic powders, in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni, Li (lithium), B (boron), Na (sodium), K (potassium) and Si, or glass.

In the embodiment, it is preferable that ceramic particles structuring the dielectric layer 11 are mixed with compound including additives and are calcined in a temperature range from 820 degrees C. to 1150 degrees C. Next, the resulting ceramic particles are wet-blended with additives, are dried and crushed. Thus, ceramic powder is obtained. For example, it is preferable that an average grain diameter of the resulting ceramic powder is 50 nm to 300 nm from a viewpoint of thickness reduction of the dielectric layer 11. The grain diameter may be adjusted by crushing the resulting ceramic powder as needed. Alternatively, the grain diameter of the resulting ceramic power may be adjusted by combining the crushing and classifying.

(Stacking process) Next, a binder such as polyvinyl butyral (PVB) resin, an organic solvent such as ethanol or toluene, and a plasticizer are added to the resulting dielectric material and wet-blended. With use of the resulting slurry, a strip-shaped dielectric green sheet with a thickness of 0.8 μm or less is coated on a base material by, for example, a die coater method or a doctor blade method, and then dried.

Next, metal conductive paste for forming an internal electrode is applied to the surface of the dielectric green sheet by screen printing or gravure printing. The metal conductive paste includes an organic binder. Thus, a pattern for forming an internal electrode layer is provided. As co-materials, ceramic particles are added to the metal conductive paste. A main component of the ceramic particles is not limited. However, it is preferable that the main component of the ceramic particles is the same as that of the dielectric layer 11.

Then, the dielectric green sheets are alternately stacked while the base material is peeled so that the internal electrode layers 12 and the dielectric layers 11 are alternated with each other and the end edges of the internal electrode layers 12 are alternately exposed to both end faces in the length direction of the dielectric layer 11 so as to be alternately led out to the pair of external electrodes 20a and 20b of different polarizations. For example, a total number of the staked dielectric green sheets is 100 to 500.

After that, a cover sheet to be the cover layer 13 is cramped on the multilayer structure of the dielectric green sheets. And another cover sheet to be the cover layer 13 is cramped under the multilayer structure. Thus, a ceramic multilayer structure is obtained. After that, the binder is removed from the ceramic multilayer structure (for example, 1.0 mm×0.5 mm) in $N_2$ atmosphere of 250 degrees C. to 500 degrees C.

(Firing process) The resulting compact is fired for ten minutes to 2 hours in a reductive atmosphere having an oxygen partial pressure of $10^{-7}$ to $10^{-10}$ atm in a temperature range of 1100 degrees C. to 1300 degrees C. In this manner, it is possible to manufacture the multilayer ceramic capacitor 100.

(Re-oxidizing process) After that, a re-oxidizing process may be performed in $N_2$ gas atmosphere in a temperature range of 600 degrees C. to 1000 degrees C.

(Forming process of external electrodes) Metal paste including a metal filler, a glass frit, a binder and a solvent is applied to the both end faces of the multilayer chip 10 by dipping, and is dried. After that, the metal paste is baked. Thus, the base layer 21 is formed. The binder and the solvent vaporize by the baking. In the method, it is preferable that the metal filler is Cu or the like. It is preferable that the baking is performed for 3 minutes to 30 minutes in a temperature range of 700 degrees C. to 900 degrees C. It is more preferable that the baking is performed for 5 minutes to 15 minutes in a temperature range of 760 degrees C. to 840 degrees C. After that, the first plated layer 22 may be formed on the base layer 21 by plating.

Next, the conductive resin layer 23 is formed. For example, the conductive resin layer 23 is formed by immersion-coating thermosetting resin such as epoxy resin or phenol resin in which conductive fillers such as Ag, Ni, Cu or the like are kneaded, on the surface of the first plated layer 22, and hardening the thermosetting resin by thermal treatment. The thickness of the conductive resin layer 23 is not limited. For example, the thickness of the conductive resin layer 23 is approximately 10 μm to 50 μm. The thickness of the conductive resin layer 23 may be determined in accordance with the size of the multilayer ceramic capacitor 100. After that, the second plated layer 24 and the third plated layer 25 are formed on the conductive resin layer 23 by electroplating or the like.

(Contact heating process) When the silicon-based material is used as the water repellent agent 30, silicon rubber is heated to 120 degrees C. or more and is contacted to the surface of the multilayer ceramic capacitor 100 after covering a region of the multilayer ceramic capacitor 100 other than a region on which the water repellent agent 30 is to be formed, with a mask. Thus, the water repellent agent 30 is formed. The fluorine rubber is heated to 150 degrees C. or more, a surface of the multilayer ceramic capacitor 100 other than a region where the water repellent agent 30 is to be formed is covered by a mask, and the fluorine rubber contacts to the surface of the multilayer ceramic capacitor 100, when the fluorine-based material is used as the water repellent agent 30. Thus, the water repellent agent 30 is formed.

In the manufacturing method of the embodiment, the water repellent agent 30 is formed between the external electrode 20a and the external electrode 20b, and the water repellent agent 30 is spaced from the external electrodes 20a and 20b. It is therefore possible to prevent the connection between the external electrode 20a and the external electrode 20b through water. It is therefore possible to prevent breakdown caused by the migration caused by the dew condensation. Since the water repellent agent 30 is spaced from the external electrodes 20a and 20b, the formation of the water repellent agent 30 on the surface of the external electrodes 20a and 20b is suppressed. It is therefore possible to suppress mounting failure of the multilayer ceramic capacitor 100. Therefore, it is not necessary to remove the water repellent agent 0 before the mounting. Even if the water repellent agent is not removed, the mounting failure is suppressed.

When the silicon rubber is heated to 120 degrees C. or more and is contacted to the surface of the multilayer ceramic capacitor 100, the temperature at which the small molecule cyclic siloxane Dn (n≥3) is released from the water repellent agent 30 is 300 degrees C. or more. Therefore, a sufficient large amount of the water repellent agent 30 can be left, after mounting the multilayer ceramic capacitor 100 with solder.

The fluorine-based material which is not released from the surface of the multilayer ceramic capacitor 100 at a temperature of less than 380 degrees C. and is released from the surface of the multilayer ceramic capacitor 100 at a temperature of 380 degrees C. or more is adhered to the surface of the multilayer ceramic capacitor 100. Therefore, a sufficient large amount of the water repellent agent 30 can be left, after mounting the multilayer ceramic capacitor 100 with solder.

The base layer 21 may be fired together with the multilayer chip 10. In this case, as illustrated in FIG. 8, the binder is removed from the ceramic multilayer structure in $N_2$ atmosphere of 250 degrees C. to 500 degrees C. After that, metal paste including a metal filler, a co-material, a binder and a solvent is coated on the both end faces of the ceramic multilayer structure by a dipping method or the like and is dried. After that, the metal paste is fired together with the ceramic multilayer structure. Firing condition is described in the above-mentioned firing process. After that, a re-oxidizing process may be performed in $N_2$ gas atmosphere in a temperature range of 600 degrees C. to 1000 degrees C. After that, the first plated layer 22 is formed on the base layer 21 by plating. Next, the conductive resin layer 23 is formed on the first plated layer 22. After that, the second plated layer 24 and the third plated layer 25 are formed on the conductive resin layer 23 by electroplating or the like.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

The multilayer ceramic capacitors in accordance with the embodiment were made and the property was measured.

(Examples 1 to 4) An organic binder was kneaded with ceramic powder, of which a main component was barium titanate, having reduction resistant. Thus, slurry was prepared. The slurry was formed into a sheet by doctor blade. Thus, a dielectric green sheet was made. Metal conductive paste of Ni having a predetermined pattern was applied to the dielectric green sheet by screen printing. Thus, an internal electrode pattern was formed. The dielectric green sheet on which the internal electrode pattern was formed was stamped into a predetermined size. And a predetermined number of the dielectric green sheets were stacked. And a ceramic multilayer structure was made by thermos-compression.

Next, the ceramic multilayer structure was cut into predetermined chip sizes and was divided. Metal paste including a co-material was applied to the both end faces of the ceramic multilayer structure (faces exposed to external electrodes) by an immersion method so that the metal paste has a predetermined electrode width (E size).

Next, the resulting ceramic multilayer structure was fired at a 1250 degrees C. in nitrogen or hydrogen atmosphere and was subjected to a predetermined thermal treatment. Thus, the base layer 21 covering the multilayer chip 10 and the both end faces of the multilayer chip 10 was made. Next, the surface of the base layer 21 was subjected to dry polishing with use of "whitemorundum" (registered trademark) as a polishing agent. After that, the first plated layer 22 was formed by Cu-plating. Next, conductive resin paste of which viscosity was adjusted to a predetermined value (10 to 30 Pa·s) was applied to the surface of the first plated layer 22 by an immersion method. Epoxy resin in which an Ag filler was kneaded was used as the conductive resin paste. After that, the conductive resin layer 23 was formed by hardening the conductive resin paste by a thermal treatment. And, the second plated layer 24 and the third plated layer 25 were formed on the conductive resin layer 23 by Ni-plating and Sn-plating. The resulting multilayer ceramic capacitor 100 had a length of 3.2 mm, a width of 2.5 mm and a height of 2.5 mm. The distance between the external electrode 20a and the external electrode 20b was 1.6 mm.

The multilayer ceramic capacitors 100 were fixed to a jig. The regions other than the regions where the water repellent agent 30 were to be formed were masked. Heated silicon rubber was contacted to the surfaces of the multilayer ceramic capacitors 100. Thus, the water repellent agent 30 was selectively formed on the regions which were not masked. In the example 1, the width of the water repellent agent 30 in the direction in which the external electrode 20a faced the external electrode 20b was 0.3 mm. In the example 2, the width was 0.7 mm. In the example 3, the width was 1.0 mm. In the example 4, the width was 1.4 mm. The water repellent agent 30 was formed on each of the upper face, the lower face and the side faces of the multilayer chips 10.

(Comparative example 1) In the comparative example 1, the water repellent agent 30 was not provided. Other conditions were the same as those of the examples 1 to 4.

(Comparative example 2) In the comparative example 2, the water repellent agent 30 was provided, as well as the examples 1 to 4. However, the width of the water repellent agent 30 was 3.2 mm. Thus, the surface of the multilayer chip 10 was not exposed.

With respect to each of the examples 1 to 4 and the comparative examples 1 and 2, 400 samples were manufactured.

(Dew condensation test) 200 samples were subjected to a dew condensation test, with respect to each of the examples 1 to 4 and the comparative examples 1 and 2. The samples were mounted on reliable substrates (FR4). The samples were put in a thermo-hygrostat tank. And, 16 V was applied to the samples. A dew condensation test program of JIS 60068-2-30 was performed 6 times. After that, it was confirmed whether the migration occurred or not. The condition of each cycle of the program is as follows. (1) The humidity was kept at 98%. The temperature was changed from 25 degrees C. to 55 degrees C. for 3 hours. (2) The temperature was kept at 55 degrees C. The humidity was changed from 98% to 93% for 15 minutes. (3) The temperature was kept at 55 degrees C. and the humidity was kept at 93% for 9 hours and 25 minutes. (4) The humidity was kept at 93%. The temperature was changed from 55 degrees C. to 25 degrees C. for three hours. (5) The temperature was kept at 25 degrees C. and the humidity was kept at 93% for 3 hours. (6) The temperature was kept at 25 degrees C. The humidity was changed from 93% to 98% for 5 hours and 30 minutes. Each sample was observed by a stereomicroscope of 40 magnifications. And it was determined whether there was a precipitate between external electrodes. When there was a precipitate, it was determined that the migration occurred.

(Mounting test) Other 200 samples were subjected to a mounting test, with respect to each of the examples 1 to 4 and the comparative examples 1 and 2. In the mounting test, a reflow furnace of which a maximum temperature was 270 degrees C. or more was used. And, an external view was observed with respect to each sample. When the crawling angle of the edge of the solder fillet was less than 90 degrees with respect to the edge face of the external electrode, it was determined as acceptance. When the crawling angle was 90 degrees or more, it was determined as non-acceptance. Each ratio of the samples determined as non-acceptance with respect to the samples determined as acceptance of the 200 samples was measured, with respect to each of the examples 1 to 4 and the comparative examples 1 and 2.

Table 1 shows the results of the dew condensation test and the mounting test.

TABLE 1

|  | EXAMPLE 1 | EXAMPLE 2 | EXAMPLE 3 | EXAMPLE 4 | COMPARATIVE EXAMPLE 1 | COMPARATIVE EXAMPLE 2 |
|---|---|---|---|---|---|---|
| WIDTH IN LONGITUDINAL DIRECTION [nm] | 0.3 | 0.7 | 1.0 | 1.4 | 0 | 3.2 |
| DEW CONDENSATION | 0/200 | 0/200 | 0/200 | 0/200 | 25/200 | 2/200 |
| MOUNTING | 0/200 | 0/200 | 0/200 | 0/200 | 0/200 | 6/200 |

All samples of the examples 1 to 4 were determined as acceptance in the dew condensation test. It is thought that this was because the water repellent agent 30 was formed between the external electrode 20a and the external electrode 20b and was spaced from the external electrodes 20a and 20b, and the connection between the external electrodes 20a and 20b through water was prevented. However, in the comparative example 1, 25 samples among 200 samples were determined as non-acceptance in the dew condensation test. It is thought that this was because the water repellent agent 30 was not formed, and the water repellency function was not achieved. In the comparative example 2, 2 samples among 200 samples were determined as non-acceptance in the dew condensation test. It is thought that this was because the water repellent agent 30 was formed from the external electrode 20a to the external electrode 20b, wettability difference was not obtained, and external electrode 20a was connected with the external electrode 20b through water.

Next, all samples of the examples 1 to 4 were determined as acceptance in the mounting test. It is thought that this was because the water repellent agent 30 was spaced from the external electrodes 20a and 20b, and the water repellent agent 30 was not provided on the external electrodes 20a and 20b. However, in the comparative example 2, 6 samples among 200 samples were determined as non-acceptance in the mounting test. It is thought that this was because the water repellent agent 30 was formed from the external electrode 20a to the external electrode 20b, and a part of the water repellent agent 30 was formed on the external electrodes 20a and 20b. In the comparative example 1, all samples were determined as acceptance in the mounting test. It is thought that this was because the water repellent agent 30 was not formed.

Although the embodiments of the present invention have been described in detail, it is to be understood that the various change, substitutions, and alterations could be made hereto without departing from the spirit and scope of the invention.

What is claimed is:

1. A ceramic electronic device comprising:
   a multilayer chip in which each of a plurality of dielectric layers and each of a plurality of internal electrode layers are alternately stacked, a main component of the dielectric layers being ceramic, the multilayer chip having a rectangular parallelepiped shape, the plurality of internal electrode layers being exposed to at least one of a first end face and a second end face of the multilayer chip, the first end face being opposite to the second end face;
   external electrodes respectively provided on the first end face and the second end face; and
   a water repellent agent that is provided on at least one face of four faces of the rectangular parallelepiped shape of the multilayer chip other than the first and second end faces, is spaced from the first and second external electrodes, and extends in a direction intersecting with a direction in which the external electrodes face with each other.

2. The ceramic electronic device as claimed in claim 1, wherein the water repellent agent has a width of 0.3 mm or more in the direction in which the external electrodes face with each other.

3. The ceramic electronic device as claimed in claim 1, wherein the external electrodes each include a conductive resin layer including a metal component.

4. The ceramic electronic device as claimed in claim 1, wherein the water repellent agent includes at least one of a silicon-based material and a fluorine-based material.

5. The ceramic electronic device as claimed in claim 1,
   wherein the water repellent agent is provided on two faces of the multilayer chip next to each other, and
   wherein the water repellent agent continuously extends on a corner between the two faces.

6. The ceramic electronic device as claimed in claim 1,
   wherein the water repellent agent is provided on two faces of the multilayer chip next to each other, and
   wherein the water repellent agent does not continuously extend on a corner between the two faces.

7. The ceramic electronic device as claimed in claim 1, wherein the water repellent agent is provided on the four faces of the multilayer chip.

8. The ceramic electronic device as claimed in claim 1, wherein the water repellent agent has two belts spaced from each other.

9. A manufacturing method of a ceramic electronic device comprising:
   preparing a ceramic electronic device having a multilayer chip, and external electrodes, the multilayer chip having a structure in which each of a plurality of dielectric layers and each of a plurality of internal electrode layers are alternately stacked, a main component of the dielectric layers being ceramic, the multilayer chip having a rectangular parallelepiped shape, the plurality of internal electrode layers being exposed to at least one of a first end face and a second end face of the multilayer chip, the first end face being opposite to the second end face, the external electrodes being respectively provided on the first end face and the second end face; and
   forming an water repellent agent on at least one face of four faces of the rectangular parallelepiped shape of the multilayer chip other than the first and second end faces, wherein the water repellent agent is spaced from the first and second external electrodes, and extends in a direction intersecting with a direction in which the external electrodes face with each other.

10. The method as claimed in claim 9, wherein the water repellent agent is formed by contacting silicon rubber heated to 120 degrees C. or more to the four faces or contacting fluorine rubber heated to 150 degrees C. or more to the four faces.

11. A ceramic electronic device comprising:
a multilayer chip in which each of a plurality of dielectric layers and each of a plurality of internal electrode layers are alternately stacked, a main component of the dielectric layers being ceramic, the multilayer chip having a rectangular parallelepiped shape, the plurality of internal electrode layers being exposed to at least one of a first end face and a second end face of the multilayer chip, the first end face being opposite to the second end face;
external electrodes respectively provided on the first end face and the second end face; and
a material layer that is provided on at least one face of four faces of the rectangular parallelepiped shape of the multilayer chip other than the first and second end faces, is spaced from the first and second external electrodes, extends in a direction intersecting with a direction in which the external electrodes face with each other, and
a contact angle of the material layer with respect to water is 90 degrees or more.

12. The ceramic electronic device as claimed in claim 11, wherein the material layer has a width of 0.3 mm or more in the direction in which the external electrodes face with each other.

13. The ceramic electronic device as claimed in claim 11, wherein the external electrodes each include a conductive resin layer including a metal component.

14. The ceramic electronic device as claimed in claim 11, wherein the material layer includes at least one of a silicon-based material and a fluorine-based material.

15. The ceramic electronic device as claimed in claim 11,
wherein the material layer is provided on two faces of the multilayer chip next to each other, and
wherein the material layer continuously extends on a corner between the two faces.

16. The ceramic electronic device as claimed in claim 11,
wherein the material layer is provided on two faces of the multilayer chip next to each other, and
wherein the material layer does not continuously extend on a corner between the two faces.

17. The ceramic electronic device as claimed in claim 11, wherein the material layer is provided on the four faces of the multilayer chip.

18. The ceramic electronic device as claimed in claim 11, wherein the material layer has two belts spaced from each other.

* * * * *